US006017178A

United States Patent [19]
Rathert

[11] Patent Number: 6,017,178
[45] Date of Patent: Jan. 25, 2000

[54] PROCESS FOR THE MECHANICAL MANUFACTURING OF A BOOK

[75] Inventor: Horst Rathert, Minden, Germany

[73] Assignee: Kolbus GmbH & Co., KG, Rahden, Germany

[21] Appl. No.: 08/928,302

[22] Filed: Sep. 12, 1997

[30] Foreign Application Priority Data

Nov. 11, 1996 [DE] Germany ........................... 196 46 395

[51] Int. Cl.$^{7}$ .............................. B32B 31/18; B42C 13/00

[52] U.S. Cl. ............................ 412/8; 412/3; 412/4; 412/5

[58] Field of Search .................................... 412/3, 4, 5, 8

[56] References Cited

U.S. PATENT DOCUMENTS 3,925,126 12/1975 Leatherman et al. ....................... 412/5

FOREIGN PATENT DOCUMENTS 1207334 12/1965 Germany .
1436086 1/1969 Germany .
195 23 813 A1 11/1995 Germany .

OTHER PUBLICATIONS

German Patent Office Search Report dated May 17, 1997 for German Patent 196 46 395.5.

*Primary Examiner*—Willmon Fridie, Jr.
*Assistant Examiner*—Mark T. Henderson
*Attorney, Agent, or Firm*—Alix, Yale & Ristas, LLP

[57] ABSTRACT

In a process for the manufacture of a book, wherein an adhesive is applied to the side faces of an inner book, the inner book is subsequently cased into a book cover and the book cover folds are shaped by the application of heat and pressure, adhesive is additionally applied to the book cover in the regions which are to be formed into the folds before the joining together of the cover and inner book and, optionally, the fold regions of the book cover and/or inner book are heated before the application of adhesive.

20 Claims, 3 Drawing Sheets

PROCESS FOR THE MECHANICAL MANUFACTURING OF A BOOK

BACKGROUND OF THE INVENTION

1. Field of the Invention

The present invention relates to the art of bookbinding and, particularly, to the completion of manufacture of a book by the application of case, i.e., the interconnected front and back covers and the spine, to an inner book, i.e., the body of the book. More specifically, this invention is directed to improvements in the "casing-in" phase of book production and, especially, to reliably forming an adhesive bond between the articulation regions, i.e., the hinge areas, defined by folds in a book cover and the underlying shaped areas of an inner book which function as hinges, i.e., the areas in which bending of the pages occurs when the book is read. Accordingly, the general objects of the present invention are to provide novel and improved methods of such character.

2. Description of the Prior Art

In the industrial production of books, i.e., in bookbinding procedures performed on a commercial scale, the final manufacturing steps which are performed are incident to the application of a case to the finish-machined inner book. As is well known, in the binding of a hard cover book, a body of leaves, forming the inner book, is joined to the case. The case includes a pair of cover boards and a spine, the spine being located intermediate the cover boards and spaced therefrom. The cover boards and spine are interconnected by, and bonded to, a sheet of flexible covering material, typically, paper. The hinge areas of the case are defined by folds, i.e., creases, which are formed in the flexible covering material intermediate the facing edges of the spine and the cover boards. The step of mating a case with an inner book is known in the art as "casing-in". The "casing-in" procedure is customarily followed by an operation known as "burning-in of the folds" in which the hinge areas of the case are formed. The "burning-in" operation may be coupled with the step of "pressing of the book as a whole".

An example of a prior art "casing-in" process and machine is described in published German Patent Specification 14 36 086. In the process practiced with this prior art apparatus, inner books, standing on the front "cut" thereof, are delivered to the casing-in station where they are individually engaged by saddle plates of a vertical conveyor. The thus engaged inner books are transported upwardly past oppositely disposed glue application rollers. These rollers deposit an adhesive over substantially the entire outer surface of the end papers or flyleaves of the inner book. A case, extracted from a supply stack, is delivered to a shaping station in which the spine of the case is given its requisite rounded shape through the action of a shaping rail and cooperating folding rails. The case with its shaped back is then moved into the path of movement of an inner book so that the rounded spine portion of the inner book will engage the complementary shaped rounded back portion of the case. The thus mated case and inner book then passes between pressure rollers which ensure the establishment of intimate contact between the insides of the cover, i.e., the cover boards, and the adhesively coated end papers. The "cased-in" book is then discharged from the vertical conveyor and delivered to a "burning-in station".

An example of a prior art "burning-in" process and apparatus is disclosed in U.S. Pat. No. 2,921,322, the "burning-in" apparatus being shown as combined with a "casing-in" apparatus to form a final assembly-line stage of a bookbinding operation. The "burning-in" apparatus of U.S. Pat. No. 2,921,322 is defined by a multiplicity of pressing devices which are disposed in a straight row with uniform mutual intervals therebetween. Each of the pressing devices includes a pair of pressure plates which are located opposite to one another with a variable interval. These plates apply compressive force to the sides of an engaged book. Heated rails for "burning-in" the folds, i.e., for producing the articulation areas of the case, are associated with the pressing devices. These heated rails operate in pairs to shape the book case folds. The rails are located on a carriage and, simultaneously with forming the folds, serve as a transport mechanism to move the books stepwise from pressing station to pressing station.

The "burning-in" of the folds, as accomplished employing apparatus of the type disclosed in U.S. Pat. No. 2,921,322, produces a recessed, generally triangular region in the covering material of the case along the facing inner edges of each of the two oppositely disposed cover boards. These recessed regions or "folds", as noted above, are formed by the application of heat and pressure. In order to ensure that the folds will retain their shapes once formed, the covering material in the fold regions should be adhesively bonded to underlying hinge joint regions of the inner book. In order to accomplish this required adhesive bonding, it has been previous practice to deposit a glue dispersion in the hinge joint regions of the inner book prior to performance of the casing-in procedure.

The heated rails which "burn-in" the folds in the cover have had the dual function of plasticizing the covering material of the cover, whereby the covering material is permanently deformed and residual tensile stresses which would tend to restore the flexible covering material of the case to its original shape are reduced, and heating the glue dispersion which has been applied in the hinge joint regions of the inner book to "activate" the adhesive. The formation of the adhesive bonds in the hinge areas should preferably be accomplished in such a manner that the book can be transported immediately subsequent to its release from the book-pressing/burning-in station without danger of the adhesive bonds being broken.

The adhesive bonding of the fold regions of the covering material of the book cover to the inner book, in accordance with the prior art, occurs in phases. Firstly, the uncoated fold regions in the covering material are wetted by the glue dispersion which has previously been applied in the joint regions of the inner book. This wetting results from the pressing of the covering material of the book case against the inner book by the heated rails which perform the "burning-in". Secondly, heat transferred from the rails will cause setting of the glue by driving off the solvent of the dispersion, typically water. During this heat transfer phase, the viscosity of the glue, and the cohesion in the film of glue as well as its adhesion to the surfaces with which it is in contact, will increase. Also, the water or other solvent which is extracted by the heat will penetrate the surrounding paper fibers, this penetration being accelerated by heat transfer from the fold forming rails during "burning-in". However, a relatively long time is nevertheless required before there is sufficient adhesion between the covering material and inner book to prevent detachment of the covering material from the inner book as a result of remaining tensile stresses and/or forces applied during subsequent book transport.

In an effort to overcome the above-briefly discussed problem, and as exemplified by the teachings of U.S. Pat. No. 2,921,322, it has previously been thought necessary that the book-pressing and burning-in of the book case hinge area defining folds be accomplished in step-wise fashion.

The disclosures of the above-referenced publications are hereby incorporated herein by reference.

SUMMARY OF THE INVENTION

The present invention comprises an improvement to the prior art which ensures that high quality books will be reliably produced. Specifically, in a casing-in process wherein the book case hinge areas are produced subsequent to the bringing together, i.e., mating of the case and inner book, the present invention permits simplification of the manufacturing process and thereby reduces the cost of the requisite machinery.

The above and other objectives of the invention, as will become apparent from the description below, are achieved by establishing an adhesive on both the hinge area defining folds of the book case and the facing hinge areas of the inner book prior to the final joining together of the case and inner book. In accordance with the invention, the hinge areas of the book case and/or the inner book are advantageously heated before the application of adhesive thereto. In one embodiment, subsequent to mating of the case and inner book, adhesively coated fold regions of the book case are pressed against adhesively coated hinge joint regions, i.e. the hinge areas, of the inner book. In another embodiment, the hinge areas of the case are pressed against adhesively coated hinge areas of the inner book and, in the process, adhesive is transferred from the inner book to the fold regions of the book case to thereby establish the facing layers of adhesive.

BRIEF DESCRIPTION OF THE DRAWING

The present invention may be better understood, and its numerous objects and advantages will become apparent to those skilled in the art, by reference to the accompanying drawing wherein like reference numerals refer to like elements in the several figures and in which:

FIGS. 7–9schematically illustrate sequential steps of a third embodiment of the invention.

DETAILED DESCRIPTION OF PREFERRED EMBODIMENTS

Figure 9:
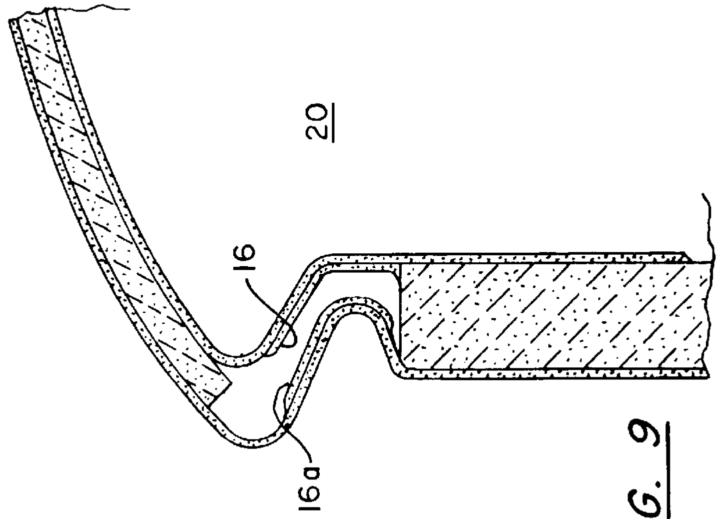
Figure 7:
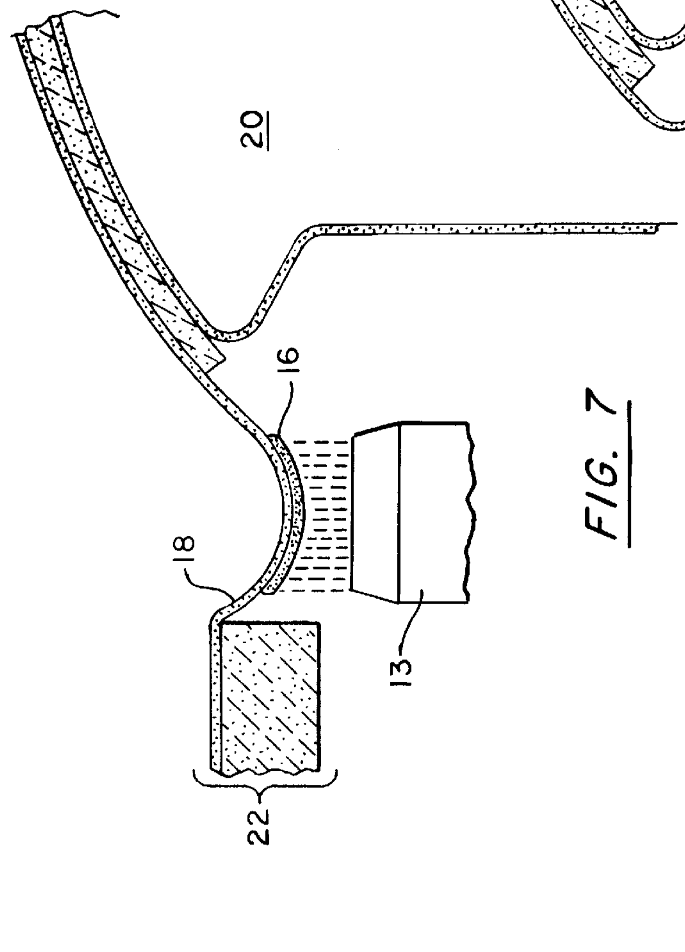

With reference to the drawing, in accordance with the present invention, the creases or folds of the covering material 18 of a book case, indicated generally at 22, which define the hinge areas of case 22 are coated with an adhesive 12 (FIGS. 1–3), **15*a* (FIG. 6), 16*a* (FIG. 9). Wetting of these hinge area defining folds by the adhesive, occurs no later than immediately after the inner book 20 and case 22 are brought together as a consequence of the fact that shaping rails 14 press the folds in the case against a laminarly glued inner book having a facing coating of adhesive 10 (FIGS. 1–3), 15 (FIG. 6), 16 (FIG. 9). This application of pressure is accompanied by the shaping of the case hinge areas, i.e., the folds or creases in the flexible covering material 18**, which may be thermally assisted, for example, through the use of heated shaping rails.

When a glue dispersion is employed as the adhesive, the inner book is advantageously heated, in the previously shaped hinge areas thereof, either by contact heat or by irradiation before the glue is applied thereto. Similarly, the case may be preheated in the areas which are to be formed into the hinges or articulation regions. Such warming of the case may advantageously be accomplished as the case passes through a shaping station, wherein the proper contour is imparted to the back of the case, immediately upstream of the casing-in station. This heating of the book case and inner book results in acceleration of the time required for the setting of the adhesive and ensures that such setting will be completed by the time the book leaves the production line.

In the practice of the present invention, as a result of the pressing together of the adhesive coated inner book and case in the hinge areas, a layer of glue which is uniformly distributed and thin will be present on the opposing material faces which are to be adhesively bonded. As is well known, it is not possible to reliably achieve an adhesive bond with a coating of an adhesive which has already set to a great extent because the surface tension of such an adhesive, which is high because of drying, permits no further wetting of the surface of a paper which is brought in contact therewith. However, if both of the surfaces which are to be bonded have already been wetted, i.e., there are two opposed layers of adhesive, these two layers will fuse with one another as result of being briefly pressed together even though a significant degree of setting has occurred. Accordingly, in the practice of the present invention, the interruption of contact between a book case hinge area defining fold and an inner book hinge area which occurs upon disengagement of the shaping rails during onward transport of the book will not result in an unacceptable product because the adhesive bond can easily be reestablished.

The invention allows the cover fold "burning-in" procedure to be reduced to a single step. The cased-in books will be subjected to this single step of "burning-in" after a transport stage of sufficient length to ensure setting of the glue, the case being briefly pressed against the inner book in the hinge areas during this transport. The thermally assisted shaping of the book case hinge area defining folds, i.e., the "burning-in", will be accomplished through the use of heated rails and the pressing of the book as a whole will be simultaneously accomplished.

Figure 2:
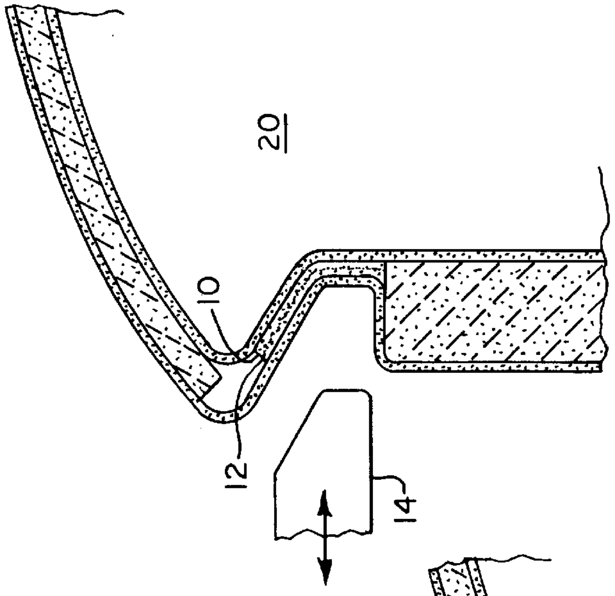
FIGS. 1–3 schematically illustrate steps sequentially performed in the practice of a first embodiment of the invention.
Figure 3:
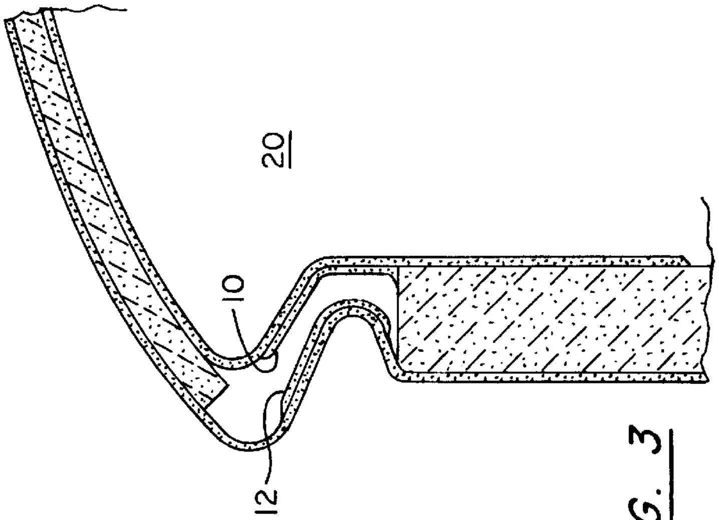
Figure 1:
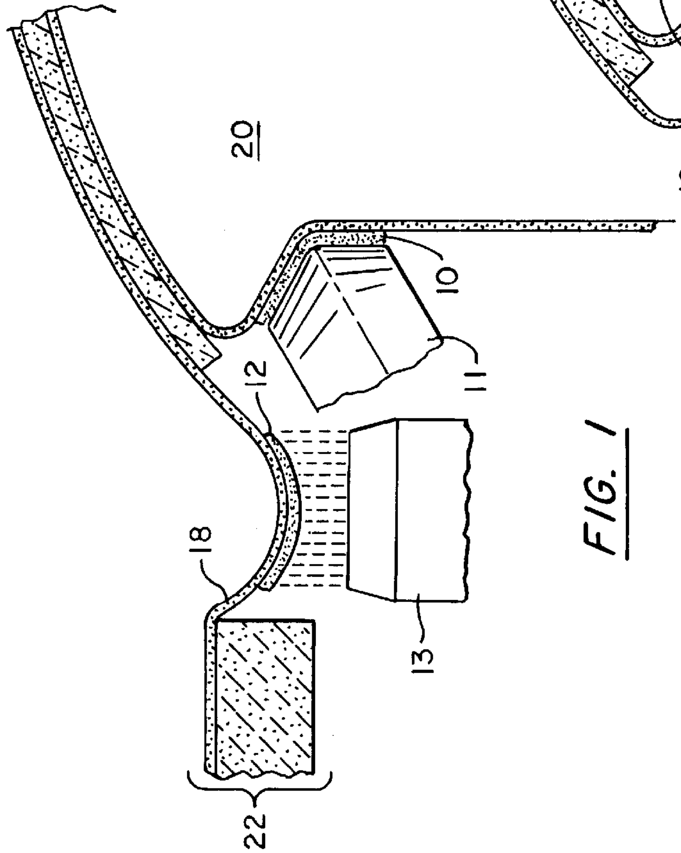

In the embodiment illustrated in FIGS. 1–3, a band or strip of adhesive 10 is applied directly to the previously shaped hinge defining areas of the inner book 20 by, for example, rollers 11. A generally complimentary shaped coating of adhesive 12 is applied to the hinge areas of the case 22 by, for example, nozzles 13. It is advantageous to briefly "press in" the hinge joints by using a shaping rail 14.

This pressing results in a uniform coating of adhesive on both of the surfaces which are to be permanently bonded together in the hinge joints of the finished book. Because of the restoring action, particularly the material stresses in the relatively stiff covering material 18 of case 22, contact between the case and inner book hinge areas is interrupted after retraction of the shaping rail 14 as depicted in FIG. 3. However, the facing surfaces of the case and inner book hinge areas will now be wetted by adhesive and the two layers of adhesive 10, 12 will be partially set. Accordingly, the layers of adhesive will reliably fuse with one another as a result of being briefly pressed together downstream of the casing-in station represented in FIGS. 1–3.

Figure 5:
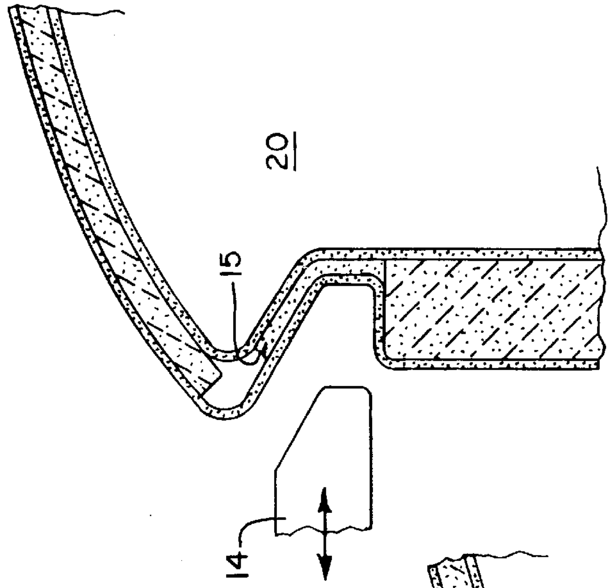
FIGS. 4–6 schematically illustrate the stepwise performance of a second embodiment of the invention.
Figure 6:
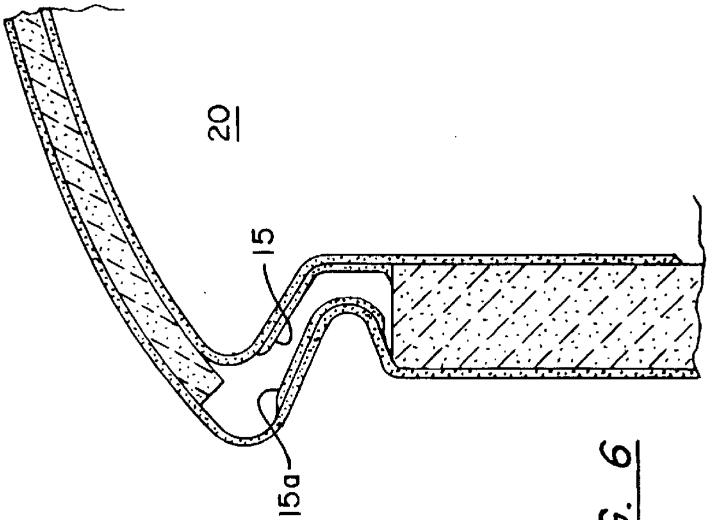
Figure 4:
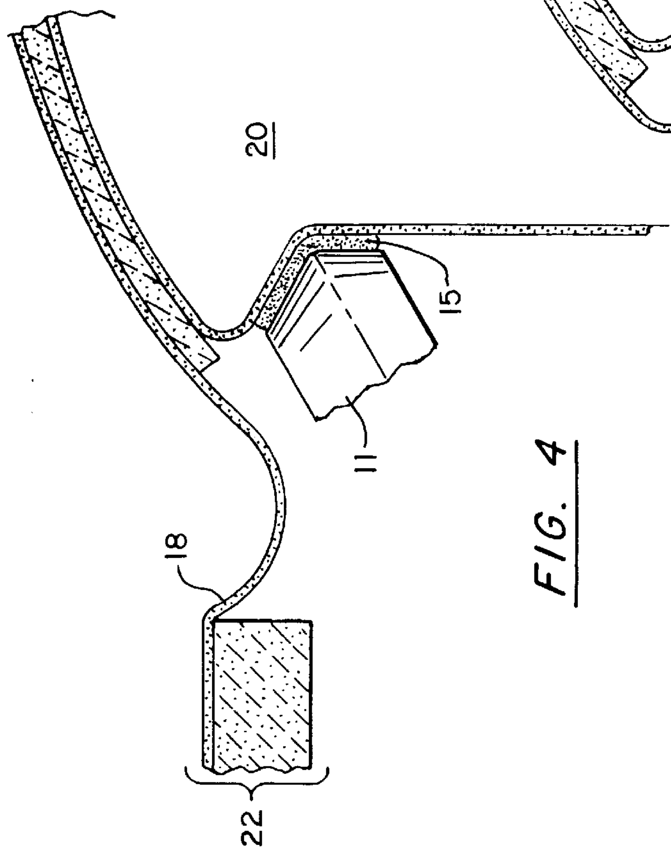
Figure 8:
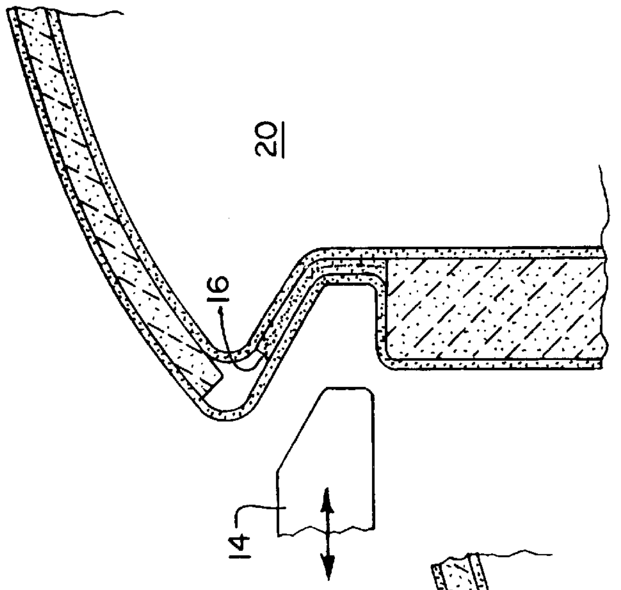

In accordance with the method of practice of the invention depicted in FIGS. 1–9, the wetting of the hinge areas of covering 18 of case 22 by adhesive may be accomplished by the application of strips of glue 16 to the inside of the case 22 immediately upstream of the delivery of the cases into the casing-in station, i.e., prior to the mating of the covers with the inner books. Alternatively, as depicted in FIGS. 4–6, adhesive 15 is transferred from the adhesively coated hinge areas of the inner book 20 to the fold regions of the inner book 20 to the fold regions of the case 22 by momentary pressing of the case hinge area defining folds into the adhesively coated hinge joint defining shaped areas of the inner book. As discusseed above, both of these techniques will result in two opposed strips of adhesive which will fuse together upon establishment or reestablishment of contact between the facing, adhesively coated surfaces of the hinge areas of the case and inner book during subsequent processing, i.e., downstream of the casing-in station.

In the practice of the present invention, a fusion adhesive may be employed. In such case, the book cover folds will be cooled, as taught in U.S. Pat. No. 5,800,110, rather than being preheated as discussed above. The disclosure of U.S. Pat. No. 5,800,110 is also incorporated herein by reference.

While preferred embodiments have been described, various modifications and substitutions may be made thereto without departing from the spirit and scope of the invention.

What is claimed is:

1. In a process for the manufacture of a book which includes an inner book with end papers and a book case with spaced apart areas shaped to function as hinges, wherein the end papers of the inner book are coated with an adhesive and the inner book is encased into the book case and the book case hinge areas are subsequently shaped, an improvement comprising applying prior to the completion of the mating of the inner book and the book case a coating of an adhesive to the spaced apart hinge areas of the book case and strips of adhesive to the areas of the inner book which are in registration with the spaced apart hinge areas of the book case and which are to be permanently bonded to the hinge areas of the book case, wherein the coating of adhesive on the spaced apart hinge areas of the book case are directly engagable with the strips of adhesive on the areas of the inner book.

2. The process according to claim 1, wherein the adhesive is applied to the spaced apart hinge areas of the book case by pressing the surfaces of the hinge areas of the book case against the strips of adhesive coated on areas of the inner book which are in registration with the case hinge areas, the pressing occurring after the mating of the book case and inner book, and allowing the pressed together areas to separate, strips of adhesive being transferred from the inner book to the hinge areas of the book case during separation.

3. The process according to claim 1, wherein the adhesive is applied in strip form directly to the hinge areas of the book case before the mating of the book case and the inner book.

4. The process according to claim 1, wherein the adhesive is applied to the inner book from adhesively coated hinge areas of the book case by pressing the hinge areas of the book case against the inner book after the mating of the book case and inner book to separate whereby adhesive is transferred from the book case to the inner book during separation.

5. The process according to claim 2 wherein the book case hinge areas are shaped during the pressing thereof against the inner book.

6. The process according to claim 4 wherein the book case hinge areas are shaped during the pressing thereof against the inner book.

7. The process according to claim 5, wherein the shaping of the hinge areas of the book case includes the application of heat.

8. The process according to claim 6, wherein the shaping of the hinge areas of the book case includes the application of heat.

9. The process according to claim 1, wherein the shaping of the hinge areas of the book case is performed with the application of heat in a single step subsequent to the mating of the inner book and the book case.

10. The process according to claim 9, wherein the hinge areas of the book case with the applied adhesive are pressed against adhesively coated areas of the inner book after the mating of the book case and inner book, and strips of adhesive are transferred from the inner book to the hinge areas of the book case.

11. The process according to claim 9, wherein the hinge areas of the book case are pressed against the inner book after the mating of the book case and inner book, and strips of adhesive are transferred from the case to the areas of the inner book which are in registration with the case hinge areas.

12. In a process for the manufacture of a book which includes an inner book with end papers and a book case with spaced apart areas shaped to function as hinges, wherein the end papers of the inner book are coated with an adhesive and the inner book is encased into the book case and the book case hinge areas are subsequently shaped, an improvement comprising applying prior to the completion of the mating of the inner book and the book case a coating of a fusion adhesive to the spaced apart hinge areas of the book case prior to the shaping of the hinge areas of the book case and applying strips of adhesive to the areas of the inner book which are in registration with the spaced apart hinge areas of the book case and which are to be permanently bonded to the hinge areas of the book case, wherein the coating of adhesive on the spaced apart hinge areas of the book case are directly engagable with the strips of adhesive on the areas of the inner book.

13. The process according to claim 12, wherein the shape of the hinge areas of the book case are fixed by cooling.

14. In a process for the manufacture of a book which includes an inner book with end papers and a book case with spaced apart areas shaped to function as hinges, wherein the end papers of the inner book are coated with an adhesive and the inner book is encased into the book case and the book case hinge areas are subsequently shaped, an improvement comprising shaping the inner book to define hinge areas which are in registration with the spaced apart hinge areas of the book case and which are to be permanently bonded to the hinge areas of the book case, applying a coating of an adhesive to the spaced apart hinge areas of the book case and applying strips of adhesive to the shaped hinge areas of the inner book prior to the completion of the mating of the inner book and the book case and further comprising the step of heating at least one of the hinge areas of the book case and the shaped hinge areas of the inner book prior to the application of the adhesive thereto.

15. The process according to claim 14, wherein the shaping of the hinge areas of the book case is performed with the application of heat.

16. The process according to claim 15, wherein the adhesive coating is applied to hinge areas of the book case by pressing the book case hinge areas against adhesively coated shaped hinge areas of the inner book after the mating of the book case and inner book, and allowing the pressed together areas to separate, strips of adhesive being transferred from the hinge areas of the book case to the shaped hinge areas of the inner book during separation.

17. The process according to claim 15, wherein the adhesive is applied to the shaped hinge areas of the inner book from adhesively coated hinge areas of the book case from adhesively coated hinge areas of the book case by pressing the hinge areas of the book case into the shaped areas of the inner book after the mating of the book case and inner book, and allowing the pressed together areas to separate whereby adhesive is transferred from the book case to the shaped hinge areas of the inner book during separation.

18. The process according to claim 16, wherein the book case hinge areas are shaped during the transfer of the adhesive.

19. The process according to claim 17, wherein the book case hinge areas are shaped during the transfer of the adhesive.

20. The process according to claim 15, wherein the adhesive is applied in strip form to the hinge areas of the book case before the mating of the book case and the inner book.

* * * * *